United States Patent Office 3,043,192
Patented July 10, 1962

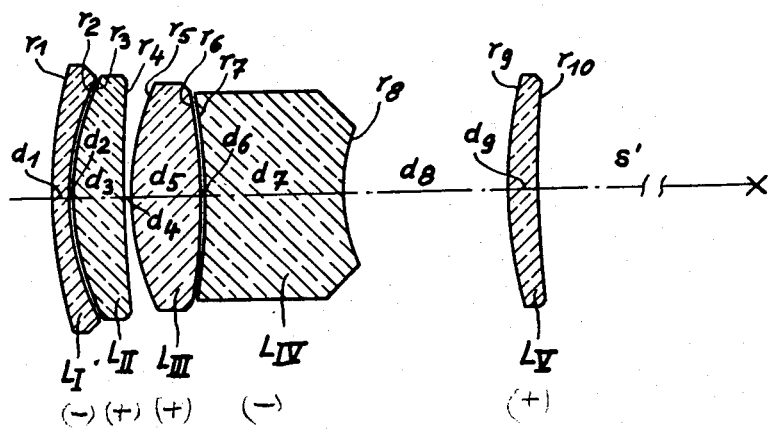

3,043,192
PHOTOGRAPHIC OBJECTIVE
Helmut Eismann and Erwin Konschack, Heidenheim (Brenz), Wurttemberg, and Günther Lange, Koenigsbronn, Wurttemberg, Germany, assignors to Carl Zeiss, Heidenheim (Brenz), Wurttemberg, Germany
Filed Jan. 4, 1960, Ser. No. 453
Claims priority, application Germany Jan. 21, 1959
4 Claims. (Cl. 88—57)

The present invention is based on the task of developing an objective for an angle of field of approximately $\pm 16°$ wherein the apical separation of the first surface from the rear focal point is smaller than the focal length and wherein the distance between the iris diaphragm and the rear focal point lies within the limits $0.50 \cdot f$ and $0.70 \cdot f$. ($f$=focal length.)

According to the invention an objective of the following design is proposed for the said purpose: the first lens is a dispersive meniscus concave towards the diaphragm, the second lens is a collective meniscus concave towards the diaphragm, the third lens is an asymmetrical collective lens with its front surface turned towards the second lens being convex and more strongly curved than its rear surface, the fourth lens is an asymmetrical dispersive lens with its rear surface turned towards the diaphragm standing between the fourth and the fifth lens being concave and more strongly curved than its front surface, the fifth lens is a meniscus-shaped collective lens concave towards the image, the Abbe-$\nu$-number of the first lens is smaller than the Abbe-$\nu$-number of the second lens.

Both with a view to the coma correction and with a view to favourable mounting of the individual lenses it is advisable to cement together the first lens with the second lens and the third lens with the fourth lens.

In the appended illustration the schematic design of one embodiment of an objective according to the invention is represented in section. The numerical values are based on the focal length $f=1.00$. The aperture ratio amounts to 1:4, the angular field is $\pm 16°$.

In the appended table the numerical values for the said embodiment are given.

Herein are designated with $L_I \ldots L_V$ the lenses,
$r_1 \ldots r_{10}$ the radii,
$d_1 \ldots d_9$ the axial separations,
$n_d$ the refractive indices,
$\nu$ the Abbe-$\nu$-numbers,
$s'$ the back focal length, and with
$f$ the focal length of the objective.

*Table*

| Lenses | Radii | Axial Separations | $n_d$ | $\nu$ |
|---|---|---|---|---|
| $L_I$ | $r_1 = +0.45403f$ | $d_1 = 0.0180f$ | 1.67270 | 32.23 |
|  | $r_2 = +0.27240f$ | $d_2 = 0.0000f$ |  |  |
| $L_{II}$ | $r_3 = +0.27240f$ | $d_3 = 0.0500f$ | 1.62041 | 60.29 |
|  | $r_4 = +1.56529f$ | $d_4 = 0.0004f$ |  |  |
| $L_{III}$ | $r_5 = +0.27240f$ | $d_5 = 0.0676f$ | 1.50013 | 61.59 |
|  | $r_6 = -2.30856f$ | $d_6 = 0.0000f$ |  |  |
| $L_{IV}$ | $r_7 = -2.30856f$ | $d_7 = 0.1397f$ | 1.61762 | 52.70 |
|  | $r_8 = +0.18469f$ | $d_8 = 0.1623f$ |  |  |
| $L_V$ | $r_9 = +0.48441f$ | $d_9 = 0.0296f$ | 1.71300 | 53.89 |
|  | $r_{10} = +0.98764f$ |  |  |  |
|  | $s' = 0.4769$ |  |  |  |

We claim:
1. A photographic objective consisting of five lenses of which the first lens is a dispersive meniscus concave towards the diaphragm, the second lens is a collective meniscus concave towards the diaphragm, the third lens is an asymmetrical collective lens with its front surface turned towards the second lens being convex and more strongly curved than its rear surface, the fourth lens is an asymmetrical dispersive lens with its rear surface turned towards the diaphragm standing between the fourth and the fifth lens being concave and more strongly curved than its front surface, and the fifth lens is a meniscus-shaped collective lens concave towards the image, and in which the Abbe-$\nu$-number of the first lens is smaller than the Abbe-$\nu$-number of the second lens.

2. An objective according to claim 1 in which the first and the second lens are cemented together wherein.

$L_I \ldots L_V$ are the lenses,
$r_1 \ldots r_{10}$ are the radii,
$d_1 \ldots d_9$ are the axial separations,
$n_d$ are the refractive indices,
$\nu$ are the Abbe numbers,
$s'$ is the back focal length, and
$f$ is the focal length of the objective.

3. An objective according to claim 1 in which the third and the fourth lens are cemented together.

4. An objective according to claim 1 in which the first lens is cemented with the second lens and the third lens is cemented with the fourth lens.

References Cited in the file of this patent
UNITED STATES PATENTS 2,270,235    Warmisham _____ Jan. 20, 1942
2,458,836    Cox _____ Jan. 11, 1949